US006226417B1

(12) United States Patent
Yamagata et al.

(10) Patent No.: US 6,226,417 B1
(45) Date of Patent: May 1, 2001

(54) METHOD AND SYSTEM FOR RECOGNIZING A ROTATED IMAGE PATTERN WITH REDUCED PROCESSING TIME AND MEMORY SPACE

(75) Inventors: Hideaki Yamagata; Michiyoshi Tachikawa; Tatsuya Kuranaga, all of Kanagawa; Akihiko Hirano, Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/128,836

(22) Filed: Aug. 4, 1998

(30) Foreign Application Priority Data

Aug. 4, 1997 (JP) .................................. 9-208877
Jan. 12, 1998 (JP) ................................ 10-004223

(51) Int. Cl.[7] ......................................... G06K 9/36
(52) U.S. Cl. ........................ 382/289; 356/138; 382/287
(58) Field of Search ................................ 382/289, 296, 382/297, 216, 209, 286, 291

(56) References Cited

U.S. PATENT DOCUMENTS 4,748,676 * 5/1988 Miyagawa et al. .................... 382/46
5,642,106 * 6/1997 Hancock et al. ..................... 340/988
5,854,854 * 12/1998 Cullen et al. ........................ 382/152
5,987,162 * 11/1999 Nakata ................................ 382/152
6,018,990 * 2/2000 Ueke ................................... 73/104

FOREIGN PATENT DOCUMENTS 8-279021   10/1996  (JP) .
9-147109    6/1997  (JP) .

OTHER PUBLICATIONS

Lin, et al. "Chinese Signature Verification with Moment Invariants", IEEE, Jun., 1996.*
Sangassapaciriya, et al. "Similarity Measures for Compressed Image Databases", IEEE, 1997.*
Kim, et al. "A Practical Pattern Recognition System for Translation, Scale and Rotation Invaviance", IEEE, Sep., 1994.*

* cited by examiner

Primary Examiner—Joseph Mancuso
Assistant Examiner—Yosef Kassa
(74) Attorney, Agent, or Firm—Knoble & Yoshida, LLC

(57) ABSTRACT

An image pattern recognition process and system recognize a rotated predetermined image pattern with reduced processing time and memory requirements based upon the efficient use of the Zernike Moment.

10 Claims, 23 Drawing Sheets

FIG. 7A

| Position | y-coordinate | | | | y-coordinate | | | | Pattern | Direction | Shift |
|---|---|---|---|---|---|---|---|---|---|---|---|
| | Equation | 33 | 35 | | Equation | 33 | 35 | | | | |
| East | $r + r\times\cos 0.0°$ | 33 | 35 | | $r - r\times\sin 0.0°$ | 33 | 35 | | | West | 3 |
| East North East | $r + r\times\cos 22.5° +1$ | 32 | 34 | | $r - r\times\sin 22.5°$ | 16 | 17 | | | West | 4 |
| Northeast | $r + r\times\cos 45.0° +1$ | 32 | 34 | | $r - r\times\sin 22.5° -1$ | 10 | 10 | | | Southwest | 3 |
| North North East | $r - r\times\cos 67.5°$ | 28 | 30 | | $r - r\times\sin 67.5° -1$ | 4 | 4 | | | South | 3 |
| North | $r + r\times\cos 90.0°$ | 22 | 24 | | $r - r\times\sin 90.0°$ | 0 | 0 | | | South | 1 |
| North Northwest | $r + r\times\cos 112.5°$ | 16 | 17 | | $r - r\times\sin 112.5° -1$ | 0 | 0 | | | South | 3 |
| Northwest | $r + r\times\sin 135.0° -1$ | 10 | 10 | | $r - r\times\sin 135.0° -1$ | 4 | 4 | | | Southeast | 2 |
| West Northwest | $r + r\times\cos 157.5° -1$ | 4 | 4 | | $r - r\times\sin 157.5°$ | 10 | 10 | | | East | 3 |

$r = (\text{mask size})/2$

 : Don't Care

FIG. 7B

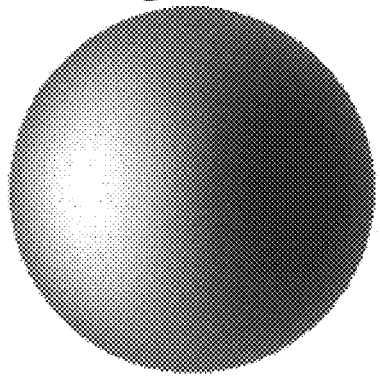
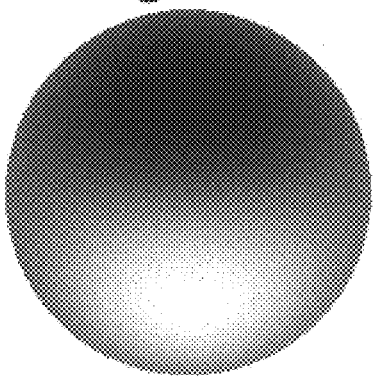
(A) Real Number Portion  (B) Imaginary Number Portion
Fig. 12A  Fig. 12B
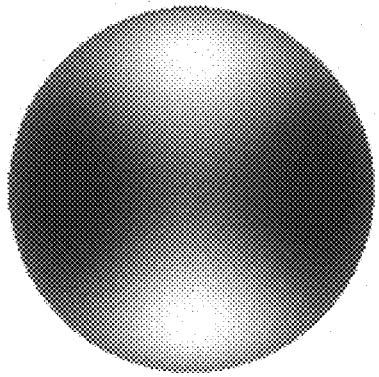
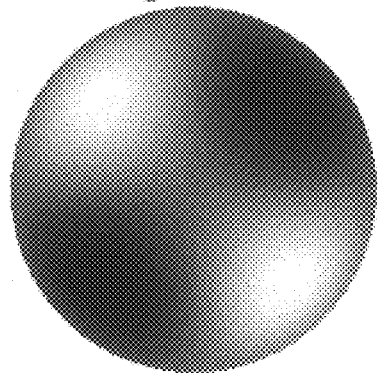
(A) Real Number Portion  (B) Imaginary Number Portion
Fig. 13A  Fig. 13B
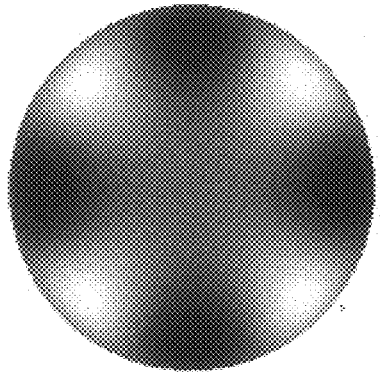
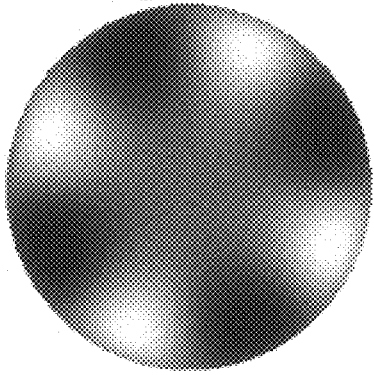
(A) Real Number Portion  (B) Imaginary Number Portion
Fig. 14A  Fig. 14B

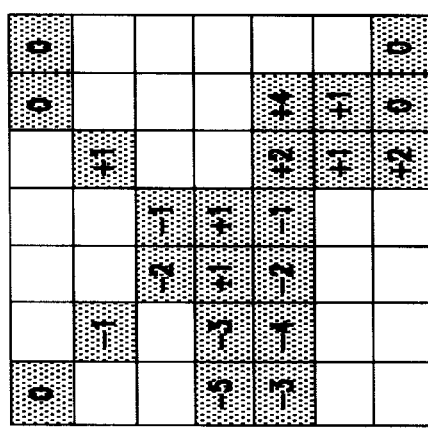
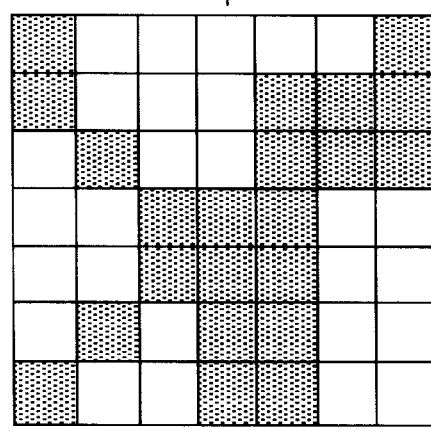
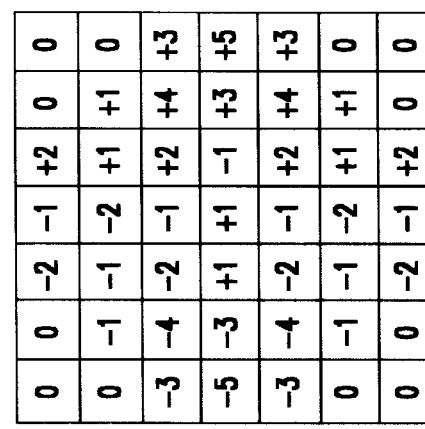
FIG. 15

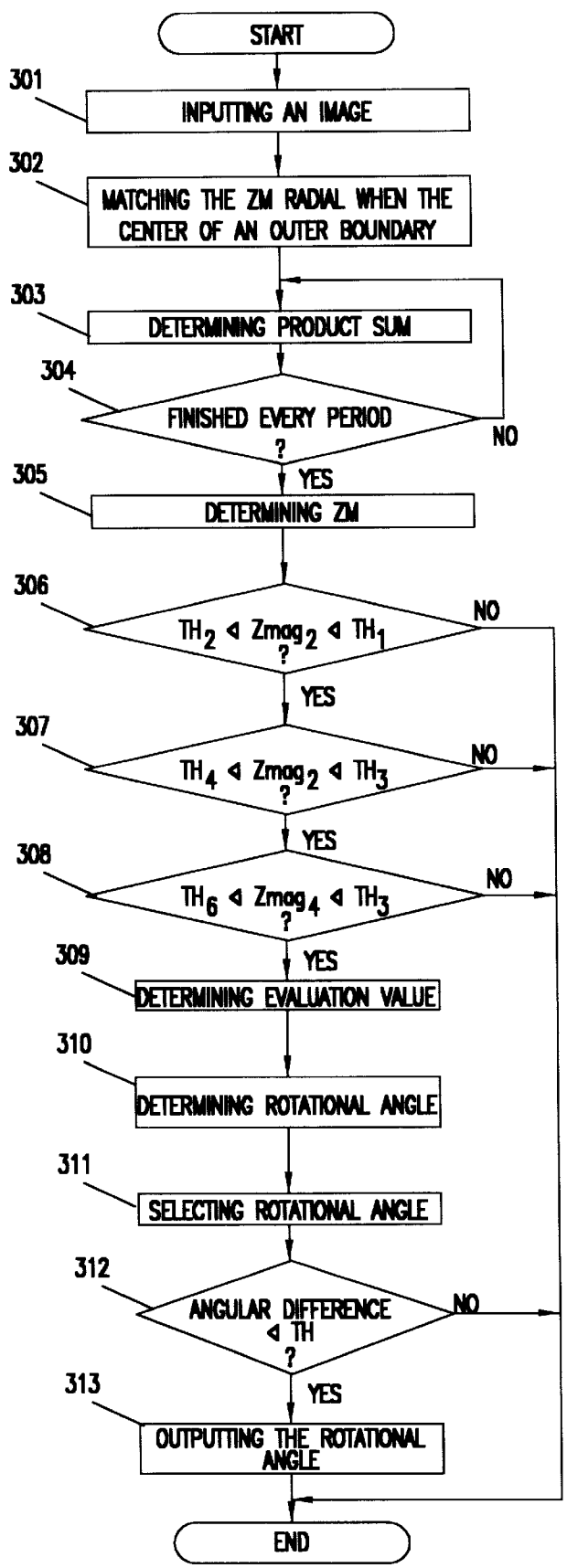

FIG. 23
Shifted Position 0
Dictionary Data
Candidate Data
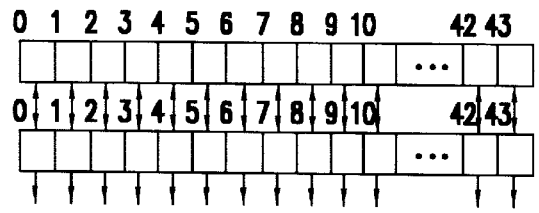
Shifted Position 1
Dictionary Data
Candidate Data
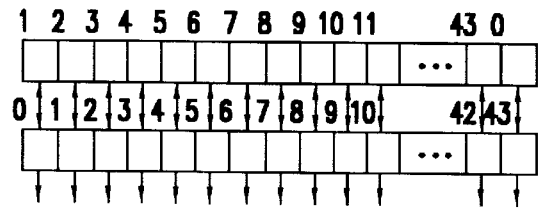
Shifted Position 2
Dictionary Data
Candidate Data
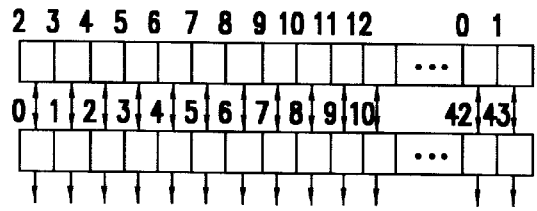
Shifted Position 3
Dictionary Data
Candidate Data
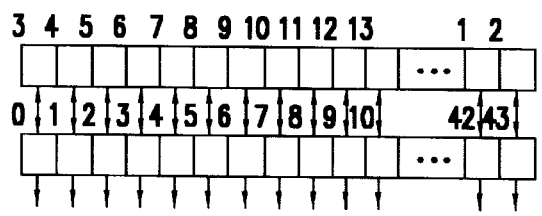
Shifted Position 4
Dictionary Data
Candidate Data
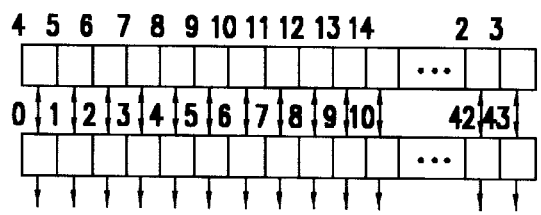
Shifted Position 43
Dictionary Data
Candidate Data
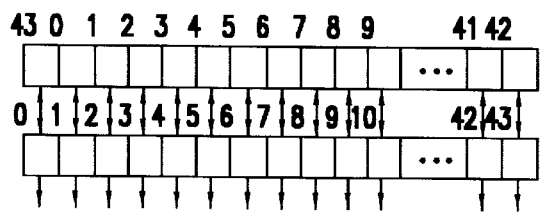

FIG. 24

| CIRCUMFERENCE NO. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| RADIUS PIXEL NO. | 7 | 10 | 13 | 16 | 19 | 22 | 25 | 28 | 31 | 34 | 37 | 40 | 43 | 46 | 49 | 52 |
| CIRCUMFERENCE PIXEL NO. | 40 | 56 | 72 | 92 | 108 | 124 | 140 | 160 | 176 | 192 | 208 | 228 | 224 | 260 | 276 | 296 |
| PIXEL NO. | 3 | 5 | 5 | 7 | 7 | 7 | 9 | 9 | 11 | 11 | 11 | 13 | 13 | 15 | 15 | 15 | ns
METHOD AND SYSTEM FOR RECOGNIZING A ROTATED IMAGE PATTERN WITH REDUCED PROCESSING TIME AND MEMORY SPACE

FIELD OF THE INVENTION

The current invention is generally related to an image pattern recognition process and system, and more particularly related to a method and a system for recognizing a rotated predetermined image pattern with reduced time and memory requirements.

BACKGROUND OF THE INVENTION

To recognize a rotated image pattern, a prior art system generally requires large memory space and or long processing time. This is because the recognition is usually accomplished in real time and the image pattern may be reduced, enlarged or rotated. Any combination of these factors further complicates the processing time and memory space requirements and tends to lower accuracy in correctly recognizing an image pattern.

Prior art attempts include the use of the Zernike Moment in recognizing an image pattern. For example, Japanese Laid Patent Publication Hei 9-147109 (Application Serial Number Hei 7-301250) discloses the reduced memory requirement in recognizing a predetermined image pattern based upon the use of a radial polynomial table containing intermediate values for determining Zernike Moment values. The Zernike Moment values are defined as a product of a radial polynomial value and a pixel value. Although a size difference of the predetermined image pattern is accommodated by adjusting the radial polynomial table values, a rotated image pattern as shown in FIG. 1 is not recognized according to the disclosure. This is because the Zernike Moment values for a predetermined image pattern are constant over the rotational angle of the image.

In order to recognize a predetermined image pattern which is rotated at an arbitrary angle, prior art attempts such as Japanese Laid Patent Publication Hei 8-279021 (Application Serial Number Hei 7-301250) disclose that a rotational angle of a predetermined image pattern is determined based upon a characteristic value such as a number of "on" pixels at equidistant locations from a common point. The measure characteristic value is compared to a set of standard dictionary values each for a known angle, and a rotational angle is selected according to minimal distance to the standard characteristic value. However, this prior art attempt requires additional processing for higher degree characteristic values as well as the number of comparisons.

SUMMARY OF THE INVENTION

In order to solve the above and other problems, according to a first aspect of the current invention, a method of recognizing an image pattern having an outer boundary, including inputting an input image pattern and a standard dictionary containing standard characteristic values for predetermined image patterns; determining whether an outer boundary exists for the input image pattern; determining a rotational angle of the input image pattern based upon the outer boundary; determining a characteristic value at each of a set of predetermined relative locations within the input image pattern; adjusting the characteristic values according to the rotational angle; and determining whether the input image pattern matches one of the predetermined image patterns based upon a similarity distance between the standard characteristic values and the adjusted characteristic values.

According to a second aspect of the current invention, a method of determining a rotational angle of an image pattern having an outer boundary, including: inputting an input image pattern and a radial polynomial table containing sets of Zernike Moment (ZM) intermediate values for a predetermined specific size of the input image pattern, each set containing the ZM intermediate values each at a predetermined rotational angle for a predetermined periodicity; determining a plurality of Zernike Moment (ZM) values by multiplying a predetermined set of the ZM intermediate values by pixel values at predetermined equidistant location from a center of the input image pattern; assigning an evaluation value for each of the ZM values by multiplying the ZM value and a corresponding periodicity; and determining a rotational angle of the input image pattern based upon a largest one of the evaluation values.

According to a third aspect of the current invention, a system for recognizing an image pattern having an outer boundary, including: an input unit for inputting an input image pattern and a standard dictionary containing standard characteristic values for predetermined image patterns; an outer boundary determination unit connected to the input unit for determining whether an outer boundary exists for the input image pattern; a rotational angle detection unit connected to the outer boundary determination unit for determining a rotational angle of the input image pattern based upon the outer boundary; and a pattern matching unit connected to the rotational angle detection unit for determining a characteristic value at each of a set of predetermined relative locations within the input image pattern and for adjusting the characteristic values according to the rotational angle, the pattern matching unit determining whether the input image pattern matches one of the predetermined image patterns based upon a similarity distance between the standard characteristic values and the adjusted characteristic values.

According to a fourth aspect of the current invention, A system for determining a rotational angle of an image pattern having an outer boundary, comprising: an input unit for inputting an input image pattern and a radial polynomial table containing sets of Zernike Moment (ZM) intermediate values for a predetermined specific size of the input image pattern, each set containing the ZM intermediate values each at a predetermined rotational angle for a predetermined periodicity; a Zernike Moment generation unit connected to the input unit for determining a plurality of Zernike Moment (ZM) values by multiplying a predetermined set of the ZM intermediate values by pixel values at predetermined equidistant location from a center of the input image pattern; an evaluation unit connected to the Zernike Moment generation unit for assigning an evaluation value for each of the ZM values by multiplying the ZM value and a corresponding periodicity; and a rotational angle determination unit connected to the evaluation unit for determining a rotational angle of the input image pattern based upon a largest one of the evaluation values.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 7A and 7B are a table for summarizing information on obtaining coordinates along an outer boundary.

FIGS. 12A and 12B respectively illustrate a real number portion and an imaginary number portion of the Zernike Moment radial polynomial values of third degree and first periodicity.

FIGS. 13A and 13B respectively illustrate a real number portion and an imaginary number portion of the Zernike Moment radial polynomial values of fourth degree and second periodicity.

FIGS. 14A and 14B respectively illustrate a real number portion and an imaginary number portion of the Zernike Moment radial polynomial values of sixth degree and fourth periodicity.

FIG. 15 illustrates an exemplary product summation for determining the Zernike Moment values.

FIG. 16 a flow chart illustrating steps involved in one preferred process of determining a rotational angle according to the current invention.

FIG. 19 illustrates one example of a circumference position table.

FIG. 23 illustrates the selection of the shortest distance for determining a rotational angle.

FIG. 24 is a table illustrating a number of pixels for an exemplary input image having a circular boundary.

DETAILED DESCRIPTION OF THE PREFERRED EMBODIMENT(S)

Figure 1A:
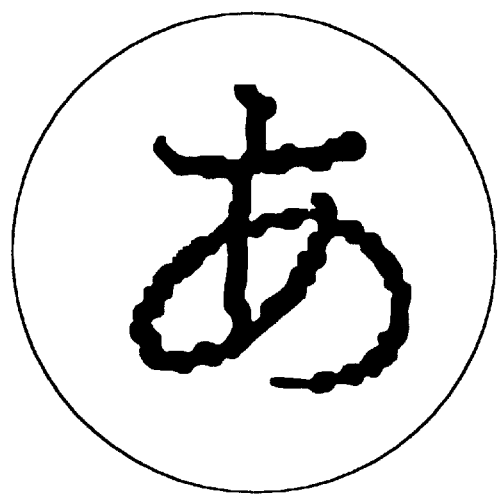
FIG. 1 is an example of a rotated image pattern such as a Japanese character.
Figure 1B:
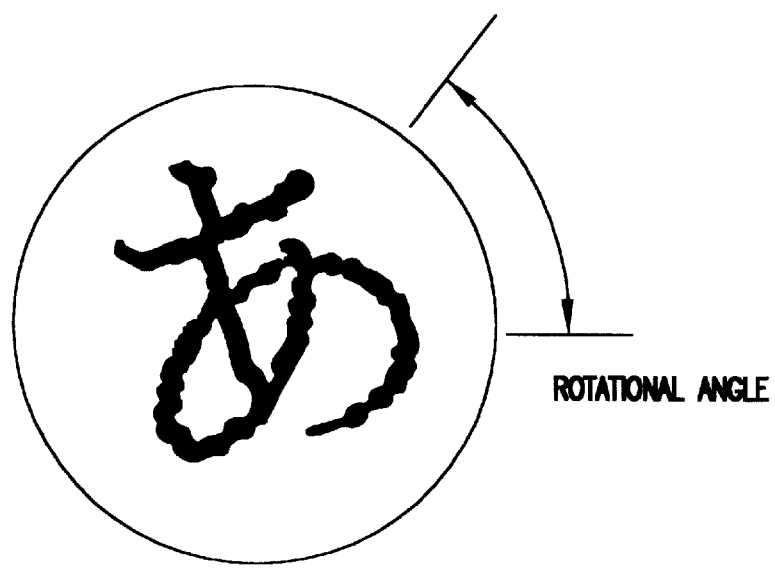
Figure 2:
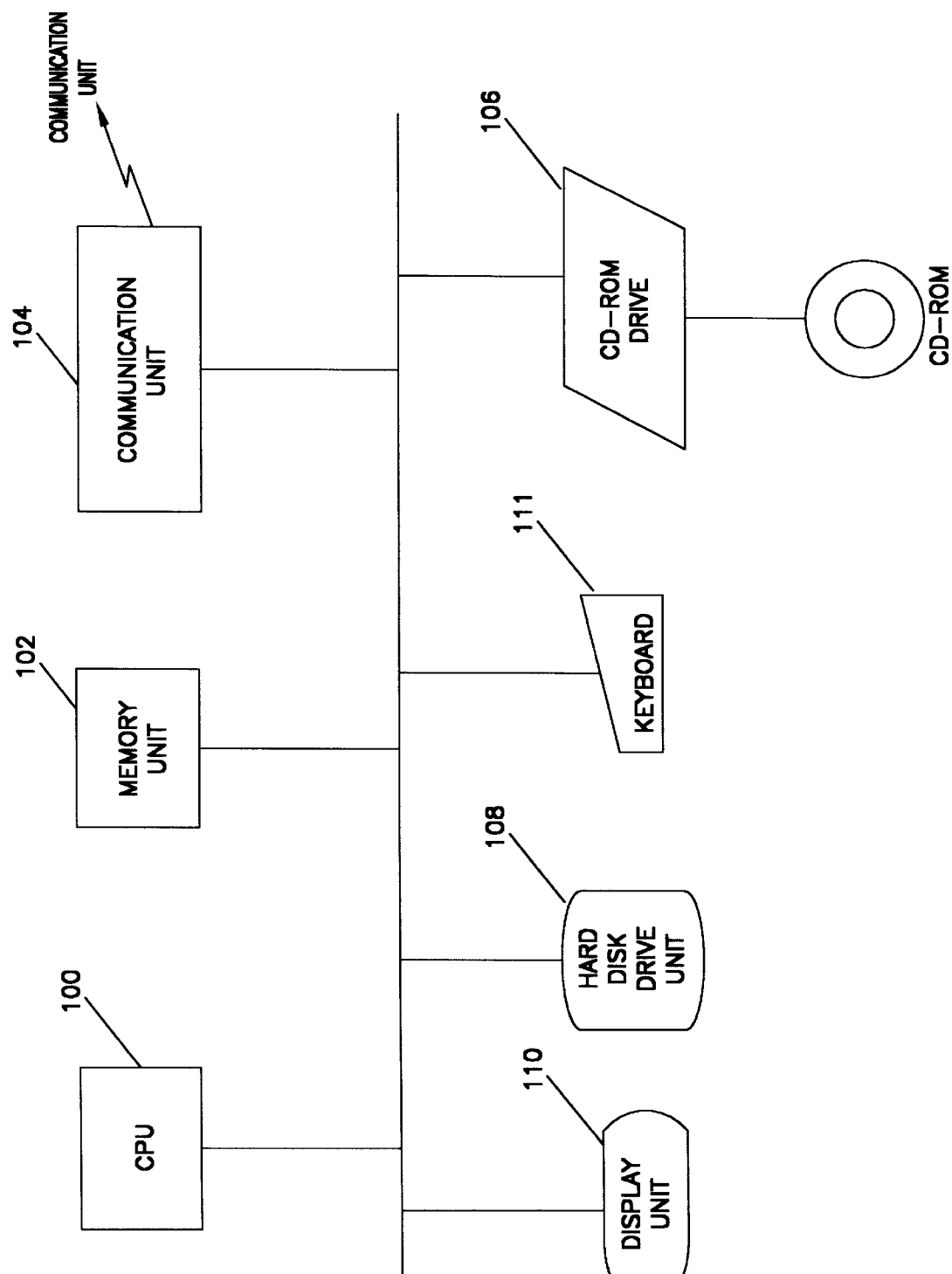
FIG. 2 is a block diagram illustrating one preferred embodiment of the system for recognizing a rotated image pattern according to the current invention.

Referring now to the drawings, wherein like reference numerals designate corresponding structure throughout the views, and referring in particular to FIG. 2, one preferred embodiment of the system for recognizing a rotated image pattern with reduced time and memory space according to the current invention includes a CPU 100, a memory unit 102, a communication unit 104 which is connected to a communication line, a display unit 110, an input unit such as a keyboard 108, and storage unit such as a hard disk 108 and a compact disk (CD) drive and a CD. An image data containing an image pattern to be recognized is imported to the memory unit 102 from the storage unit or via the communication unit 104. The CPU 100 run a predetermined software including the computer instructions for efficiently recognizing the image pattern with reduced memory space. A user interacts with the system with the keyboard to specify the commencement of the recognition process, and the intermediate and or final results are displayed on the display unit 110.

Figure 3:
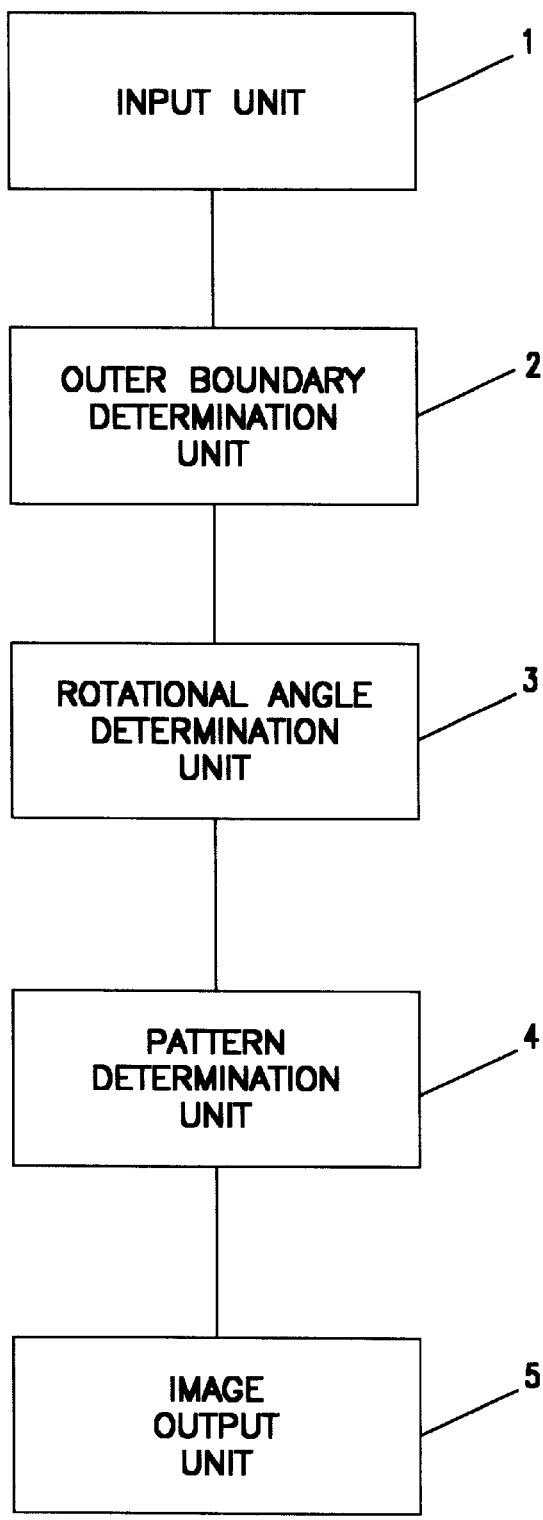
FIG. 3 is a block diagram illustrating a second preferred embodiment of the system for recognizing a rotated image pattern according to the current invention.

Now referring to FIG. 3, a second embodiment of the system for recognizing a rotated image pattern with reduced time and memory space according to the current invention includes an input unit 1, an outer boundary determination unit 2, a rotational angle determination unit 3, a pattern determination unit 4 and an image output unit 5. The second preferred embodiment is either software or hardware. The input unit 1 inputs image data containing a predetermined input image pattern to be recognized as well as standard or dictionary data to be compared. The outer boundary determination unit 2 determines an outer boundary of the input image pattern to be recognized. The outer boundary has a predetermined shape which includes a circle, a square and a rectangle. After the predetermined outer boundary is determined, the rotational angle determination unit 3 determines a rotational angle of the input image pattern. The rotational angle determination unit 3 determines the rotational angle using a measured value and a standard value of the outer boundary. One example of theses values includes Zernike moment values, and detailed implementations will be later described. Based upon the rotational angle, the image pattern determination unit 4 first adjusts the standard or measured values and then determines whether the adjusted values substantially or most closely match the unadjusted values based upon a predetermined set of rules. Upon recognizing the image pattern match, the image output unit outputs the recognition results.

Figure 4:
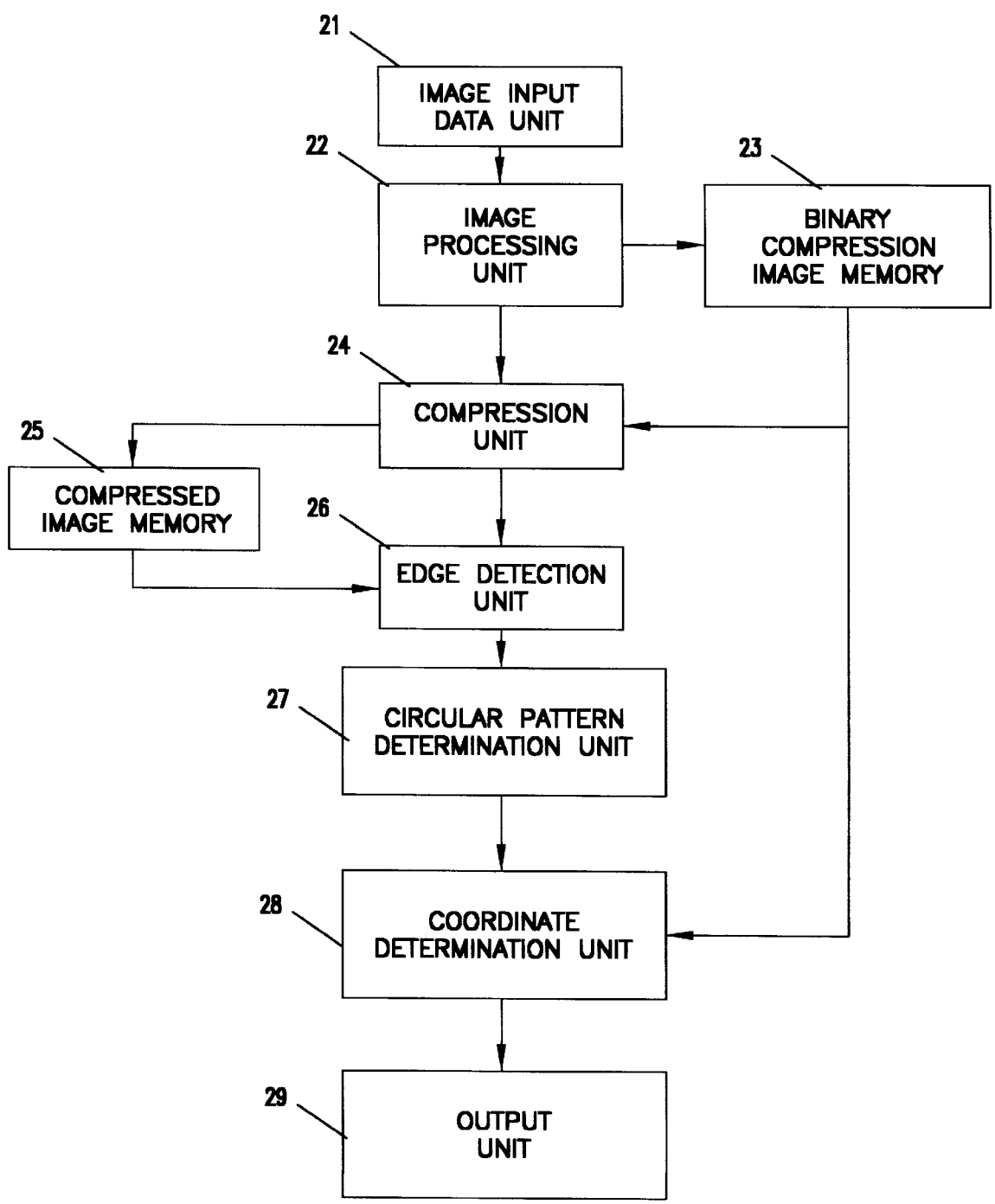
FIG. 4 is a block diagram illustrating components in an outer boundary determination unit.

Referring to FIG. 4, one example of the outer boundary determination unit 2 further includes an image input data unit 21 for inputting the image data into the outer boundary determination unit 2, an image processing unit 22 for digitizing and modifying the image data, a binary compression image memory 23 and a compression unit 24 for generating compressed binary image data, a compressed image memory unit 25 and an edge detection unit 26 for detecting a predetermined outer boundary, a circular pattern determination unit 27 for determining whether or not the outer boundary is circular, a coordinate determination unit 28 for determining coordinates of the circular outer boundary based upon the digitized image data and an output unit for outputting the results including the outer boundary detection and the outer.

Figure 5:
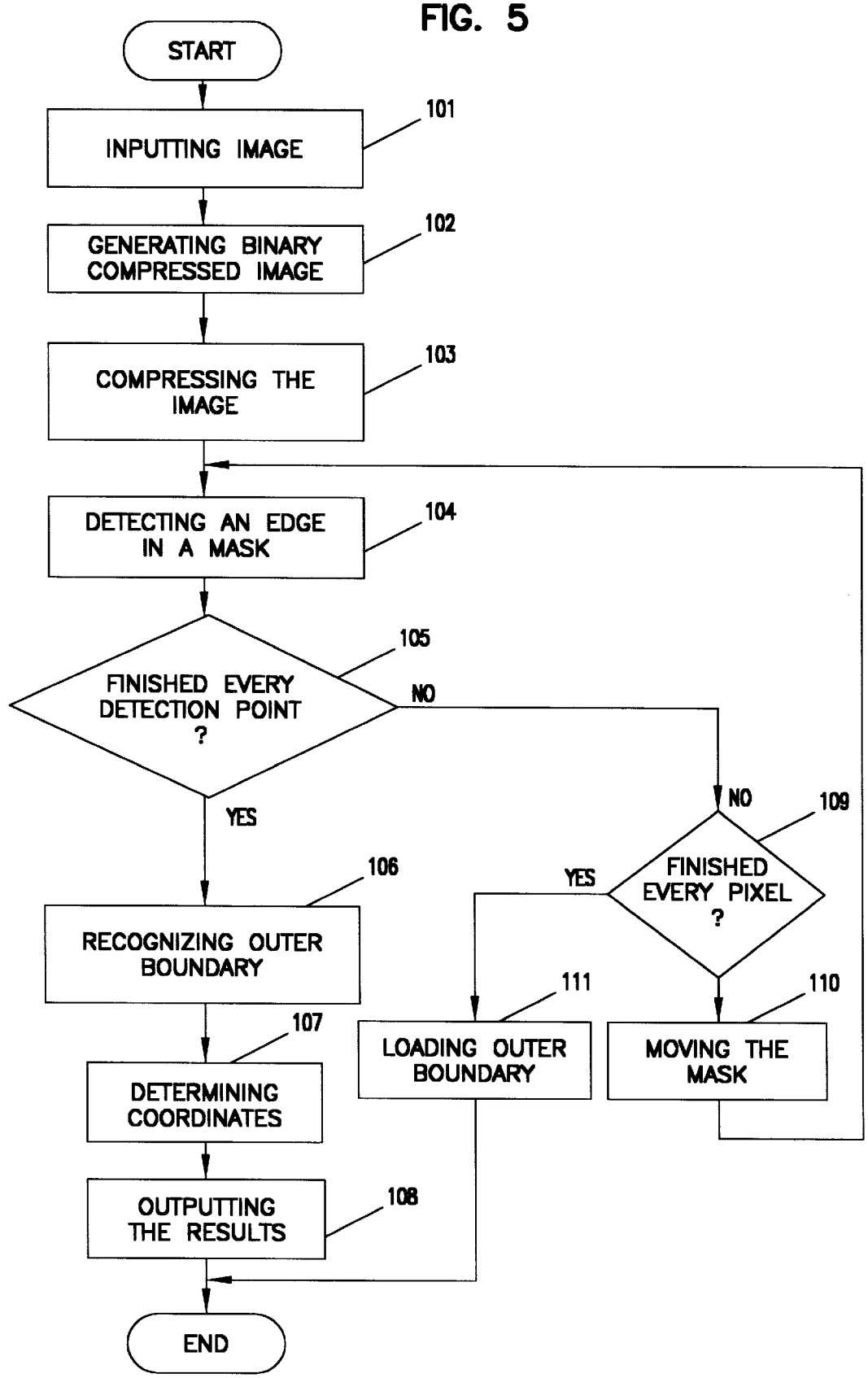
FIG. 5 is a flow chart illustrating steps involved in one preferred process of determining an outer boundary.

To further describe the outer boundary determination, FIG. 5 is a flow chart for illustrating steps involved in detecting a circular outer boundary. In a step 101, color image data as well as standard data are inputted. The inputted image data is first digitized into black-and-white image data based upon a predetermined threshold value such as an intensity value and stored in a step 102. For example, the digitized values are compressed to ¼ of 200×200 dpi. The digitized data is then compressed for further processing in a step 103. The compression is accomplished by "ORing" each 4×4 pixel block. That is, if any one of the pixels is "on," the entire 4×4 block is compressed to single compressed "on" block data. Still using the above example, after the compression, the data amount is 1/16 or 50×50 dpi. This compression saves memory space during the rotation angle determination and pattern recognition processes. In a step 104, a mask of a predetermined size and shape is used to detect an edge. In general, the edge detection is performed by detecting an edge from predetermined relative locations on the mask towards a center of the input image pattern within the mask. If an edge is not detected from every location, it is determined whether or not every pixel has been processed in a step 109. If the processing has not been complete, the mask is moved by one pixel in a step 110, and the steps 104 and 105 are repeated. In case the processing has been complete for every pixel, it is determined that the predetermined outer boundary is lacking in the image pattern, and the edge detection process is finished. On the other hand, if the edge is detected from every detection point or predetermined relative location in a step 105, a predetermined outer boundary is recognized in the input image pattern in step 106. The coordinates of the detected edge or outer boundary are determined, and the coordinates are also corrected for the compression in a step 107. The corrected coordinates are outputted in a step 108.

Figure 6:
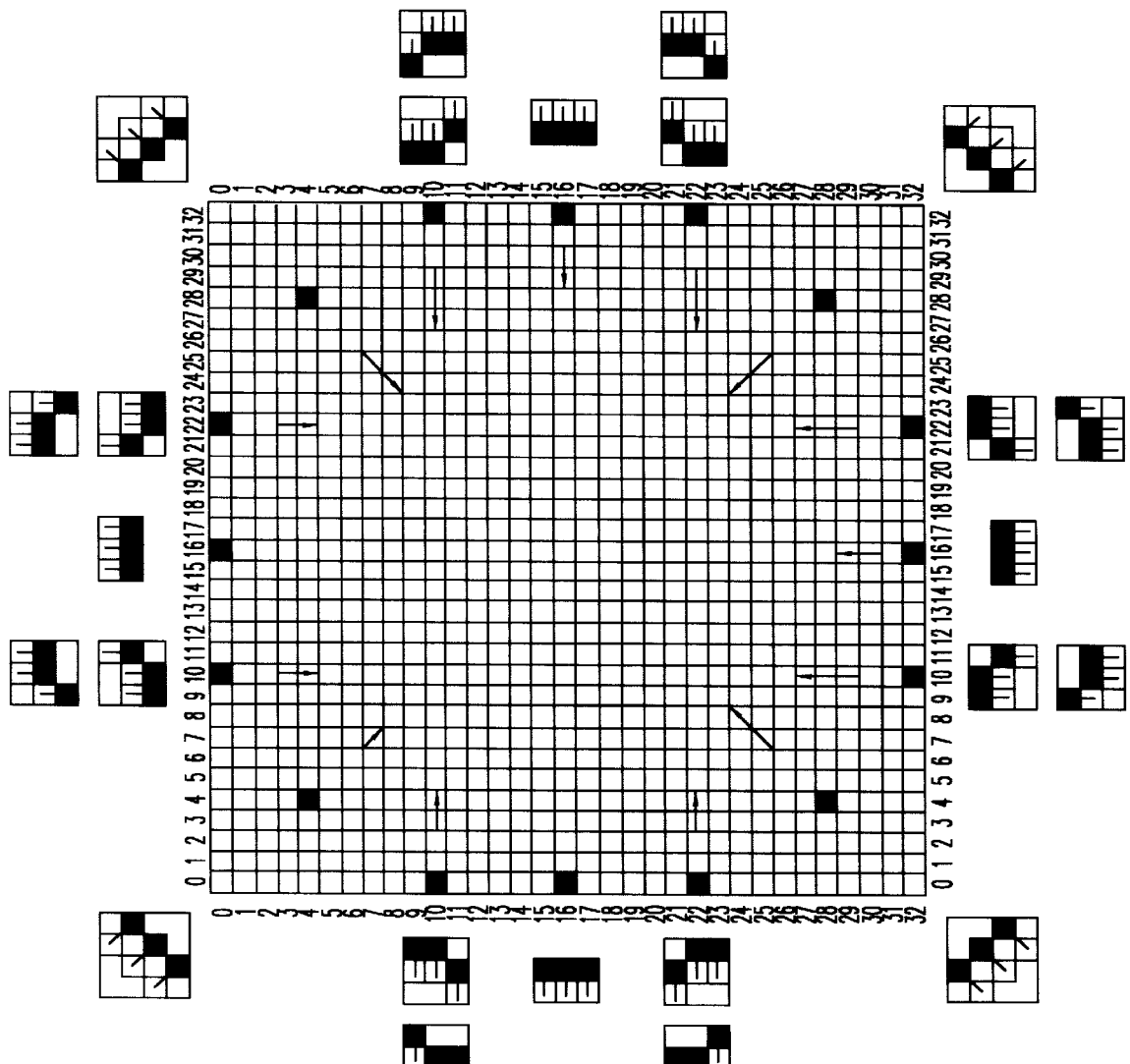
FIG. 6 is a diagram for an exemplary circular mask in detecting an outer boundary.

Now referring to FIG. 6, one exemplary circular mask is illustrated. The size of the mask is 33 by 33 pixels, and there are sixteen predetermined locations on the mask. An edge detection step is performed from each of these locations towards the center of the mask as indicated by arrows. At each location, a particular set of pixel patterns or local mask patterns is used to detect a circular edge, and the same set of pixel patterns is moved towards the center of the mask to further find any match. At certain locations, only one pixel pattern (4×4 or 3×2 pixels) is used while at other locations, two pixel patters (3×3 pixels) are used. One way to determine the circular mask size is: (a diameter of a circular outer boundary/a compression rate)+line width+margin. For example, a circular mask size for the 15 mm diameter circular outer boundary is 33 pixels if each mm contains 16 pixels. That is, 240 pixels (15×16)/8+2 pixel line width+1 pixel margin=33.

FIGS. 7A and 7B are tables which summarize the coordinate determination for the detected edge at each predetermined location as indicated in the left most column. The X coordinate and Y coordinate are determined by a respective equation, and the initial coordinates for each location is enumerated for either a 33×33 mask or a 35×35 mask. In addition, the tables include associated local mask patterns, the direction of the movement of the mask towards the center as well as the number of pixels to be moved for each pattern. The tables are illustrated for exemplary purposes and are not limited to any particular format or contents.

Figure 8:
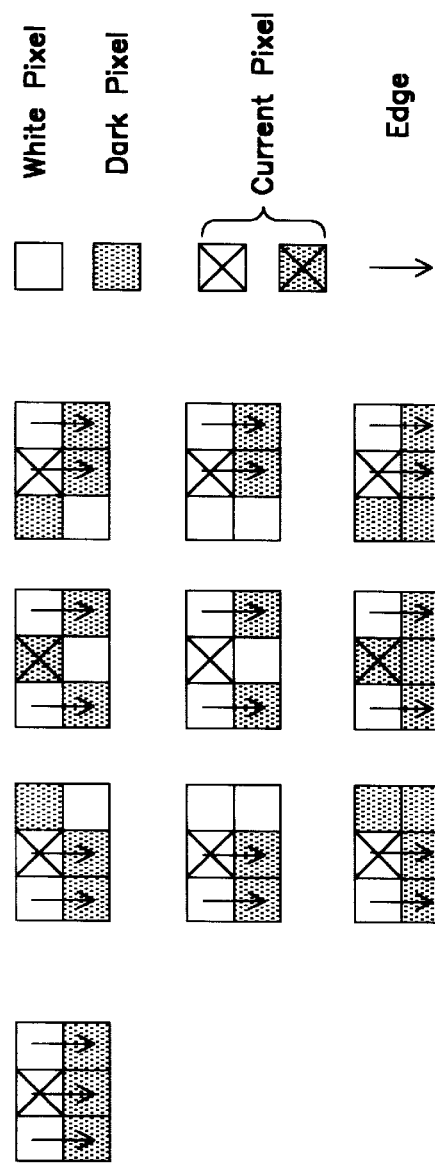
FIG. 8 is a diagram illustrating edge detection for an outer boundary.

FIG. 8 further illustrates the edge detection at a particular location using a predetermined mask pattern. At the south location, the 3×2 pixel pattern is used. Although the pixel pattern in FIG. 7B indicates that three adjacent pixels in the same row need to be "on" while the other row need be "off" in order to detect an edge. According to one method of the current invention, if there are at least two contrasting adjacent pixels as indicated by arrows, these adjacent pairs of pixels indicate an edge.

Figure 9A:
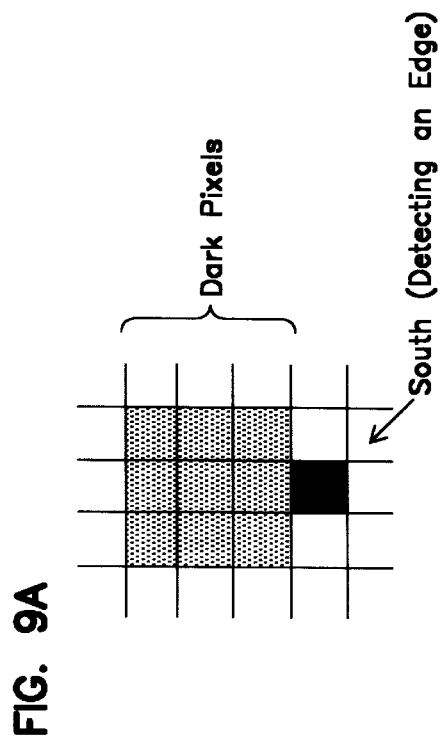
FIGS. 9A and 9B are diagrams illustrating a relation between compressed and uncompressed data sets on and near an edge of an outer boundary.
Figure 9B:
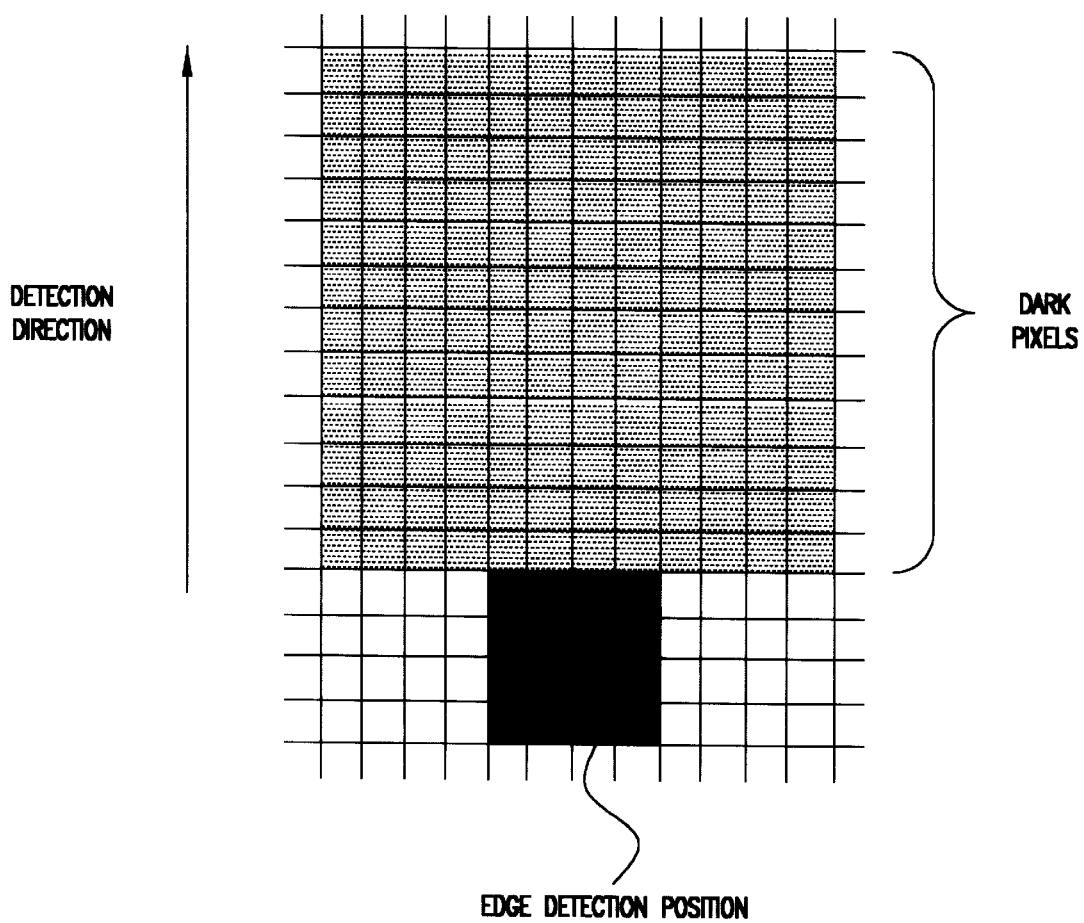

Now referring to FIGS. 9A and 9B, the coordinates of the edge line are determined using compressed and uncompressed pixel patterns. FIG. 9A illustrates one exemplary coordinate determination in the compressed data that a first "on" pixel is located at a southern end of an edge. As described above, a row of the three adjacent pixel pattern is used to detect the edge. The southern end is the Y-ending coordinate while a northern end is the Y-beginning coordinate. Similarly, an eastern end is the X-beginning coordinate while a western end is the X-ending coordinate. In other words, within the nine (3×3) pixels in hatched lines, at least one is originally "on" before the compression.

Now referring to FIG. 9B, the original pixel data size is 12 by 12 since the compression rate is 1/16. The edge detection position is indicated by the 3×3 pixels which are located at the southern position. Each row of 12 pixels is examined at a time in an upward direction indicated by an arrow, and when at least one pixel is "on," the row is considered to be the Y-beginning coordinate. Similarly, each row of 12 pixels is examined at a time in a downward direction to located the Y-ending coordinate. To determine X-coordinates, each column of 12 pixels is examined respectively in a left-to-right direction to locate a western end or the X-beginning coordinate and in a right-to-left direction to locate an eastern end or the X-ending coordinate. However, for the western and northern ends are determined by shifting by only one pixel, forty-eight pixels are detected. Based upon the above described X and Y coordinates, a center of a predetermined outer boundary is determined. The above determined information is generally used for determining a rotational angle.

Figure 10A:
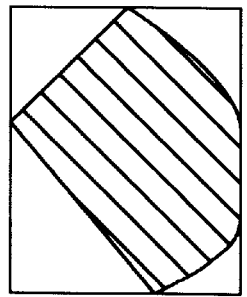
FIGS. 10A through 10F illustrate that an outer boundary is rectangular or square.
Figure 10B:
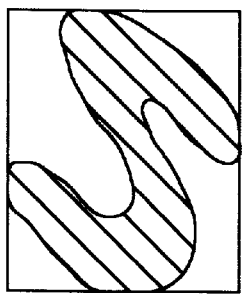
Figure 10C:
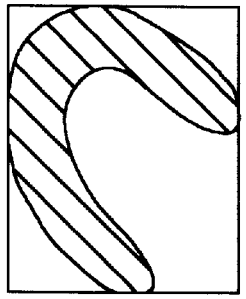
Figure 10D:
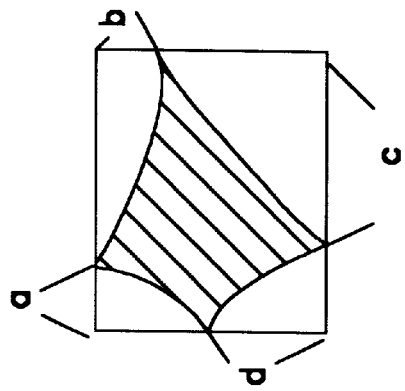
Figure 10E:
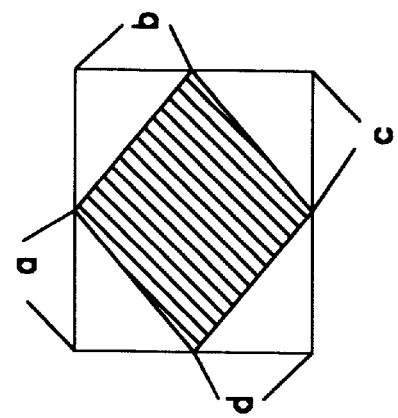
Figure 10F:
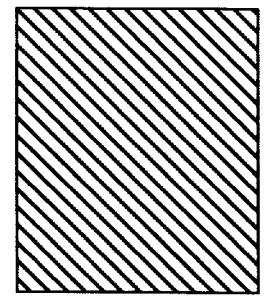

In addition to the above described circular outer boundaries or masks, referring to FIGS. 10A through 10F, alternative embodiments include square and rectangular masks and outer boundaries. To determine the non-circular outer boundaries, an image pattern is circumscribed by a minimal circumscribing boundary as shown in FIGS. 10A through 10D. The minimal circumscribing boundary or rectangle minimally encloses an image pattern. The minimal circumscribing rectangle as shown in FIG. 10D matches the image pattern itself. However, if the rectangular image is rotated, and if it contacts at one point on each edge of a horizontally placed predetermined square with an equal distance a, b, c and d from each corner as shown in FIG. 10E, the minimal circumscribing rectangle is determined to be a rotated square. On the other hand, if the minimal circumscribing boundary is not rectangle as shown in FIG. 10F, the distances a, b, c, and d are not equal from each corner of the predetermined horizontally placed rectangle.

In order to describe the rotational angle determination process, the Zernike moment is first described. As defined by Kim and Po Yuan in "A Practical Pattern Recognition System for Translation, Scale and Rotation Invariance," Pp. 391–396, Proc. CVPR, June, 1994:

$$R_{nm}(\rho) = \sum_{s=0}^{n-\backslash m\backslash/2} (-1)^s \frac{(n-s)!}{s!\left(\frac{n+\backslash m\backslash}{2}-s\right)!\left(\frac{n-\backslash m\backslash}{2}-s\right)!} \rho^{n-2s} \quad (1)$$

where Rnm(ρ) is a radial polynomial equation which is determined by a degeree, periodicity, and a distance from the center.

$$Re_{(Anm)} = \frac{n+1}{\pi} \int_{x^2+y^2 \leq 1} f_{(x,y)} R_{nm}(\rho) \cos m\theta \, dx \, dy \quad (2)$$

where $Re_{(anm)}$ is a real number portion of the Zernike moment.

$$Im_{(Anm)} = -\frac{n+1}{\pi} \int_{x^2+y^2 \leq 1} f_{(x,y)} R_{nm}(\rho) \sin m\theta \, dx \, dy \quad (3)$$

where $Im_{(anm)}$ is an imaginary number portion of the Zernike moment.

In the above equations (1) through (3), n is a degree of the Zernike Moment while m is periodicity. The absolute value of m is equal to or smaller than that of n, and the difference between them must be an even number. The Zernike moment as defined below is constant over a rotational angle.

$$Re_{(anm)}^2 + Im_{(anm)}^2$$

Because of this constant characteristic of the Zernike moment, a predetermined image pattern $f_{(x,y)}$ is identified based upon the Zernike moment. Variables x and y specify a particular image pattern size. One exemplary method normalizes the variable x and y values which range from 0 to 1. The coordinates are adjusted (enlarged or reduced) so that the furtherest point from the center of the image pattern is 1.

If the equations (2) and (3) are used to determine the Zernike moment for every image pattern candidate, since it takes a large amount of processing time, the use of the equations is not practical. To shorten the processing time, a table containing intermediate values for the Zernike moment is prepared in advance for a predetermined image pattern in predetermined sizes. The intermediate values are determined by the following equations.

$$ReT_{(Anm)}(x, y) = \frac{n+1}{\pi} R_{nm}(\rho) \cos m\theta \quad (4)$$

$$ImT_{(Anm)}(x, y) = -\frac{n+1}{\pi} R_{nm}(\rho) \sin m\theta \quad (5)$$

A product of a pixel value and the above described Zernike moment intermediate value is the Zernike moment. In addition to the equation (4) and (5), the following equations (6) and (7) incorporate the Zernike moment intermediate table values in order to determine the Zernike moment.

$$Re_{(Anm)} = \int_{x^2+y^2 \leq 1} f_{(x,y)} ReT_{(Anm)}(x,y) \, dx \, dy \quad (6)$$

$$Im_{(Anm)} = \int_{x^2+y^2 \leq 1} f_{(x,y)} ImT_{(Anm)}(x,y) \, dx \, dy \quad (7)$$

Figure 11:
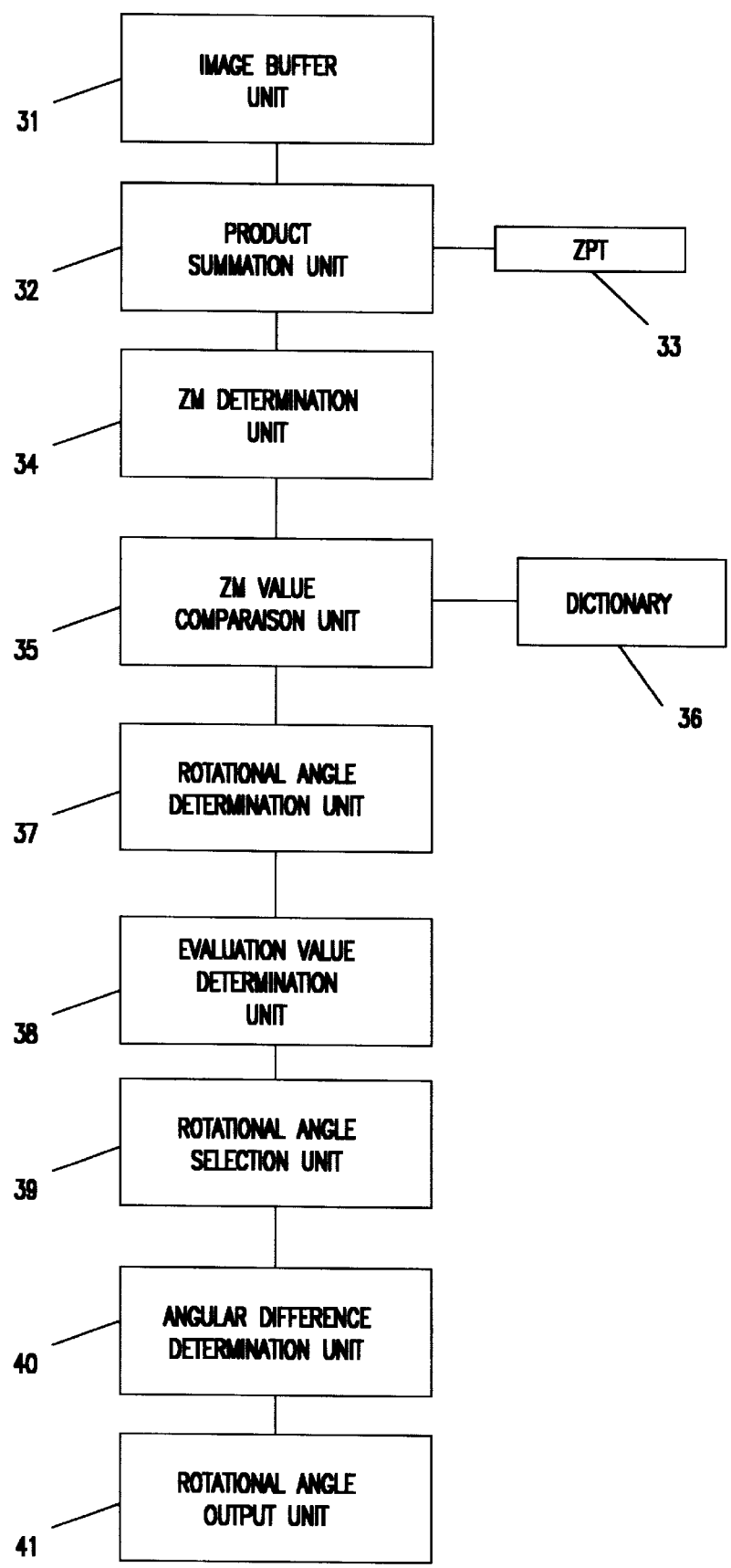
FIG. 11 is a block diagram illustrating components in one preferred embodiment of the rotational angle determination unit according to the current invention.

Now referring to FIG. 11, one preferred embodiment of the rotational angle determination unit according to the current invention further includes an image buffer unit 31 for temporarily storing input image pattern data having a predetermined outer boundary, a product summation unit for determining a product between a pixel value and a corresponding intermediate value from a radial polynomial table 33, a Zernike Moment (ZM) determination unit 34 for determining a ZM value; a ZM value comparison unit 35 for comparing the ZM value to standard or dictionary ZM values stored in a ZM dictionary; a rotational angle determination unit 37 for determining a rotational angle based upon a ZM value; an evaluation value determination unit 38 for determining a evaluation value for each rotational angle based upon the ZM value, degree and periodicity; a rotational angle selection unit 39 for selecting the most appropriate rotational angle based upon an evaluation value; an angular difference determination unit 40 for determining an angle difference; and a rotational angle output unit 41 for outputting a final rotational angle based upon the selected rotational angle and the angle difference.

FIGS. 12 through 14 each illustrate a Zernike radial polynomial table (ZPT). A "off" or white pixel indicates a value of −63 while an "on" or black pixel indicates a value of 63. A value of 0 indicates gray. Now referring to FIGS. 12A and 12B, these ZPT's are third degree and first periodicity. FIG. 12A illustrates a real number portion of the ZPT while FIG. 12B illustrates an imaginary number portion of the ZPT, which is ½π rotated with respect to the real number portion. First periodicity means that one cycle for a change from black to white. FIGS. 13A and 13B respectively illustrate a real number portion and an imaginary number portion of the $4^{th}$ degree $2^{nd}$ periodicity ZPT. The imaginary number portion is rotated by ¼π with respect to the real number portion. FIGS. 14A and 14B respectively illustrate a real number portion and an imaginary number portion of the $6^{th}$ degree $4^{th}$ periodicity ZPT. The imaginary number portion is rotated by ⅛π with respect to the real number portion.

Now referring to FIG. 15, a product summation is illustrated for determining a real number portion of a Zernike Moment value. A Zernike Moment radial polynomial table (ZPT) 51 contains intermediate values or Zernike Moment (ZM) radial polynomial values for a corresponding portion 52 of input image data. Since the input image data 52 is digitized, only black or "on" pixels are considered for the product summation. The ZM radial polynomial values corresponding to the "on" pixels as shown in a product 53 are summed to render a ZM value. In other words, the summation includes 0+0+0+−1+1+−2+−1+−5+−3+1+1+−3+−4+−2+−1+2+4+1+1+2+0+0=−9. In one preferred method of determining a ZM value, a plurality of ZPT's for various degrees and periodicity is used. For example, the ZPT's are prepared for $1^{st}$, $2^{nd}$ and $4^{th}$ periodicity, and for each periodicity, ZPT's have a real number portion and an imaginary number portion. Thus, using six separate ZPT's, six ZM values are determined.

FIG. 16 is a flow chart illustrating steps involved in one preferred process of determining a rotational angle according to the current invention. In a step 301, input image data and corresponding outer boundary information are inputted. In a step 302, a center coordinate of the above determined outer boundary and a corresponding coordinate (0, 0) of the Zernike radial polynomial table are matched. Alternatively, a center of gravity is used to align the outer boundary. After the center is correctly positioned in the ZM radial polynomial table, a product between a pixel value and the corresponding intermediate value in the ZM radial polynomial table is determined in a step 303. The product determination is performed on every pixel within an area bound by the outer boundary for each of the predetermined set of periodicity by repeating the step 303 until every periodicity is considered in a step 304. Although this preferred process shows a sequential processing for each periodicity, an alternative process determines a number of product summation values in parallel. After the product summations are obtained for all of the predetermined periodicity, ZM values are determined in a step 305.

Still referring to FIG. 16, assuming the predetermined set of periodicity includes $1^{st}$, $2^{nd}$ and $4^{th}$ periodicity, a ZM value is determined and ascertained as follows in steps 305 through 308. Let ZMr1 and ZMi1 be respectively a real number portion and an imaginary number portion of the product sum using a $1^{st}$ periodicity ZM radial polynomial table. Similarly, ZMr2 and Zmi2 be respectively a real number portion and an imaginary number portion of the product sum using a $2^{nd}$ periodicity ZM radial polynomial table. Lastly, ZMr4 and Zmi4 be respectively a real number portion and an imaginary number portion of the product sum using a $4^{th}$ periodicity ZM radial polynomial table. By using the similar notation, let Zmag1, Zmag2 and Zmag4 be respectively a ZM value for the $1^{st}$, $2^{nd}$ and $4^{th}$ periodicity, and the ZM values are not affected by a rotational angle of an input image pattern. Based upon the above notations, the ZM values Zmag1, Zmag2 and Zmag4 are defined as follows:

$$Zmag1=(ZMr1)^2+(Zmi1)^2$$

$$Zmag2=(ZMr2)^2+(Zmi2)^2$$

$$Zmag4=(ZMr4)^2+(Zmi4)^2$$

These ZM values are compared to a series of predetermined ranges in steps 306 through 308 in order to ascertain their appropriateness. In other words, in the step 306, the $1^{st}$ periodicity ZPT-based ZM value Zmag1 is compared to a first predetermined range defined by two threshold values TH2 and TH1. If Zmag1 is not within the first predetermined range in a step 306, the rotational angle determination process is terminated without outputting a rotational angle. Similarly, if Zmag2 is not within a second predetermined range defined by threshold values TH3 and TH4 in a step 307, the rotational angle determination process is terminated without outputting a rotational angle. Lastly, if Zmag4 is not within a third predetermined range defined by threshold values TH5 and TH6 in a step 308, the rotational angle determination process is terminated without outputting a rotational angle. On the other hand, if the ZM values Zmag1, Zmag2 and Zmag4 are each within a respective predetermined range, the following steps are performed.

When appropriateness of the ZM values is satisfied by the above described steps, a set of steps 309 through 313 are further performed to determine a rotational angle. In a step 309, a set of evaluation values is determined for each of the ZM values. The evaluation value is defined as a product of a ZM value and a corresponding periodicity. For example, if a first periodicity ZM value Zmag1 is −9, its evaluation value is −9×1=−9. In a step 310, a first rotational angle θ1 is determined based upon a real number portion ZM value Zmr1 or an imaginary portion ZM value Zmi1. Similarly, a second rotational angle θ2 is determined based upon a real number portion ZM value Zmr2 or an imaginary portion ZM value Zmi2. Lastly, a third rotational angle θ3 is determined based upon a real number portion ZM value Zmr4 or an imaginary portion ZM value Zmi4. In a step 311, a rotational angle with the largest evaluation value is selected. In a step 312, an angle θa is defined as an angle difference between the first and second rotational angles θ1 and θ2 while an angle θb is defined as an angle difference between the first and second rotational angles θ2 and θ4. Similarly, an angle θc is defined as an angle difference between the first and third rotational angles θ1 and θ4. It is determined whether or not the angle difference values θa, θb and θc satisfy the following condition in the step 312:

$$\theta a+2\theta b+2\theta c<TH$$

where TH is a predetermined threshold value. If the above condition is satisfied, the rotational angle selected in the step 311 is outputted in a step 313. On the other hand, the above condition is not met, no rotational angle is outputted, and the rotational angle determination process is terminated.

Figure 17A:
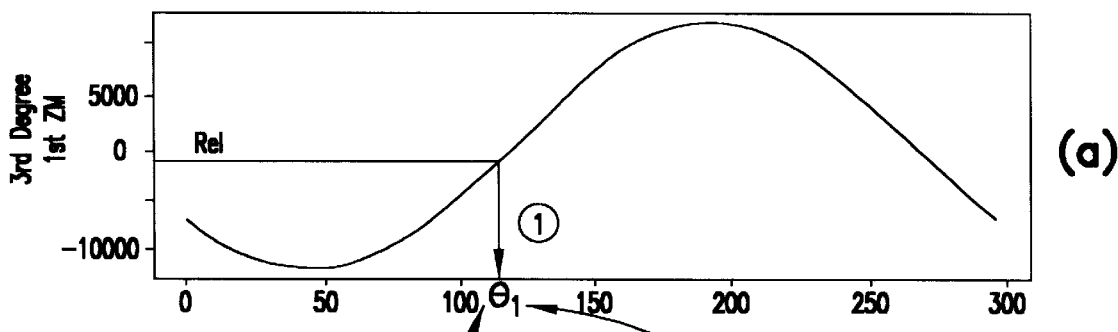
FIGS. 17A, 17B and 17C respectively illustrate a real number portion of the standard Zernike Moment values of first, second and fouth periodicity over angle of a known image pattern.
Figure 17B:
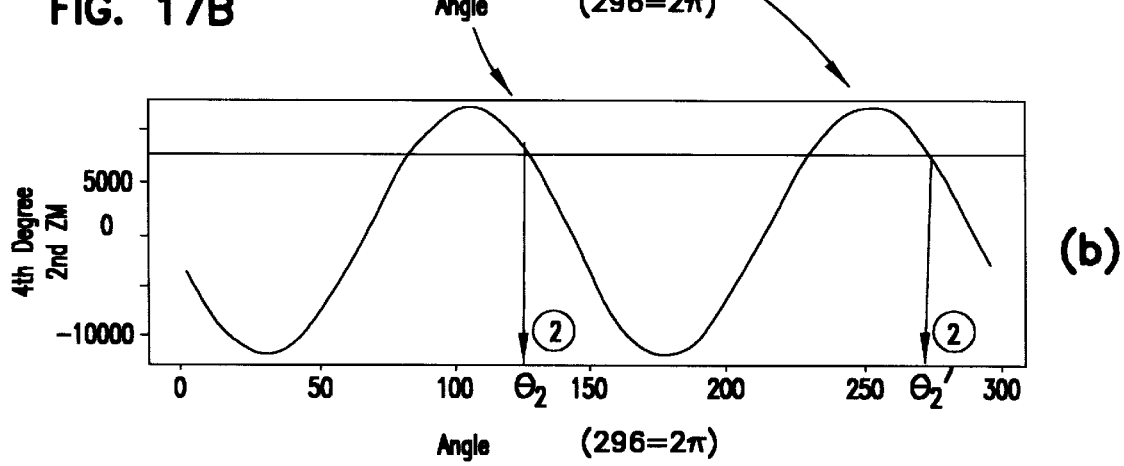
Figure 17C:
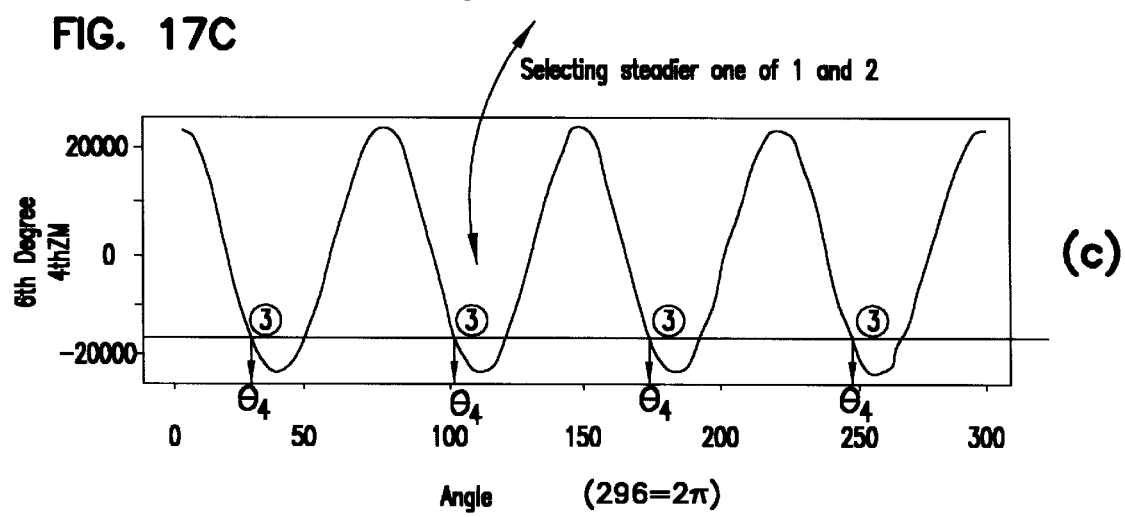

Now referring to FIGS. 17A, 17B and 17C, a rotational angle determination is further described for each periodicity. FIGS. 17A, 17B and 17C respectively show a real number portion of the standard ZM value over rotational angle of a predetermined image pattern for a $3^{rd}$ degree $1^{st}$ periodicity; a $4^{th}$ degree $2^{nd}$ periodicity and a $6^{th}$ degree $4^{th}$ periodicity. Each graph or a standard dictionary is generated by computationally rotating a predetermined image pattern by one degree between 0 and 360. The X axis indicates angle (0–2π) which is quantified in 296. The imaginary portion is phased by ½π. The product sum or ZM value obtained for an input image is thus compared to the standard dictionary to determine a rotational angle. Alternatively, the rotational angle is also determined by arctan (an imaginary number portion/a real number portion) of the ZM value. Yet another alternative method for determining the rotational angle takes arcsin of (an imaginary portion/a ZM value).

Referring to FIG. 17A, a single rotational angle for first periodicity is generally determined based upon a ZM value of an input image data that is obtained by generating a product using a first periodicity based ZPT. For an improved accuracy, it is preferred to use either of a real number portion or an imaginary number portion of the ZM value that has the smaller absolute value. In other words, a portion having a larger change ratio between an angle and a ZM value is preferred. For example, if the obtained ZM value is Re1, a rotational angle is θ1 as shown in FIG. 17A.

Now referring to FIG. 17B, second periodicity based ZM values are plotted over angle ranging from 0 to 2π. As shown, within this range, for a given ZM value, there are two candidates for a rotational angle. Only one of the candidates is correct since the other angle is due to cyclic periodicity of the Zernike Moment. In order to select the correct rotational angle, a difference in angle with respect to the above rotational angle that is selected in the first periodicity based ZM values is compared. The difference is usually smaller than π/2. One of the candidates is selected so that the second periodicity based rotational angle has a smaller difference or is closer to the above determined first periodicity based rotational angle. For example, between the two candidates θ2 and θ2', the rotational angle θ2 is selected since it is closer to the first periodicity based rotational angle θ1.

Now referring to FIG. 17C, fourth periodicity based ZM values are plotted over angle ranging from 0 to 2π. As shown, within this range, for a given ZM value, there are four candidates for a rotational angle. Only one of the candidates is correct since other angles are due to cyclic periodicity of the Zernike Moment. In order to select the correct rotational angle, the above defined evaluation values are used. If the evaluation value for the first periodicity based ZM value is lager than that of the second periodicity based ZM value, one of the four candidates that is the closest to the first periodicity based angle is selected. On the other hand, if the evaluation value for the second periodicity based ZM value is lager than that of the first periodicity based ZM value, one of the four candidates that is the closest to the second periodicity based angle is selected. For example, among the four candidates θ4, θ4', θ4" and θ4'", the rotational angle θ4 is selected since it is closer to the first or second periodicity based rotational angles θ1 or θ2.

Figure 18:
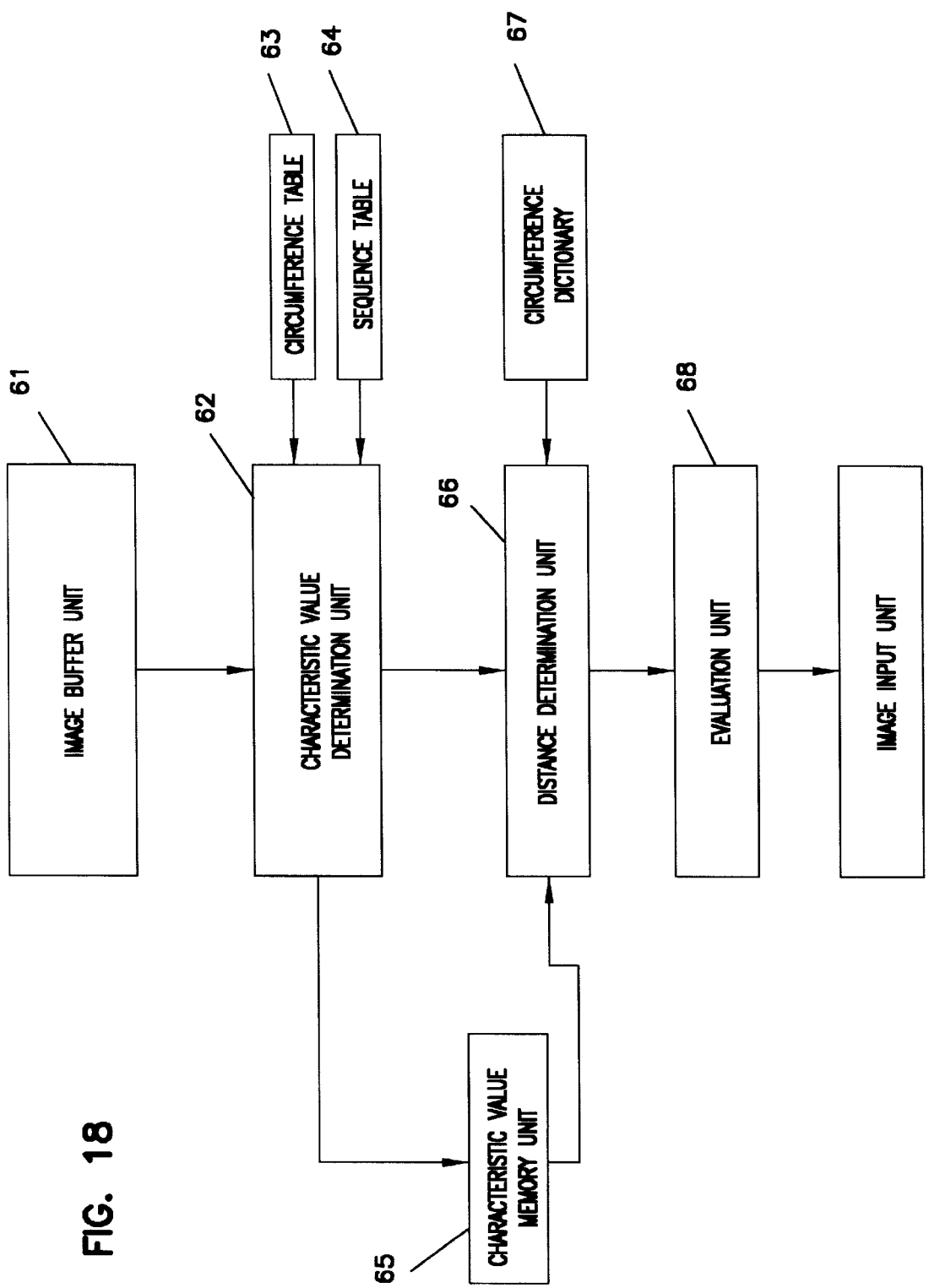
FIG. 18 is a block diagram illustrating components in one preferred embodiment of the image pattern determination unit according to the current invention.

Now referring to FIG. 18, one preferred embodiment of the pattern determination unit according to the current invention is further described. This exemplary embodiment is designed for a circular outer boundary and includes an image buffer unit 61 for storing the image pattern data; a characteristic value determination unit 62 for determining a certain characteristic value of pixels located in a predetermined circumference; a circumference table 63 for storing a position of each circumference; a sequence table 64 for storing positions corresponding to each characteristic value; a standard circumference dictionary 67 for storing characteristic values for a standard image; a distance determination unit 66 for determining a distance between a characteristic value in the characteristic value memory unit 65 and the characteristic value in the standard circumference dictionary 67; an evaluation unit 68 for determining whether or not an input image pattern matches a standard image pattern based upon an evaluation value; and an image output unit for outputting the evaluation result.

Figure 19:
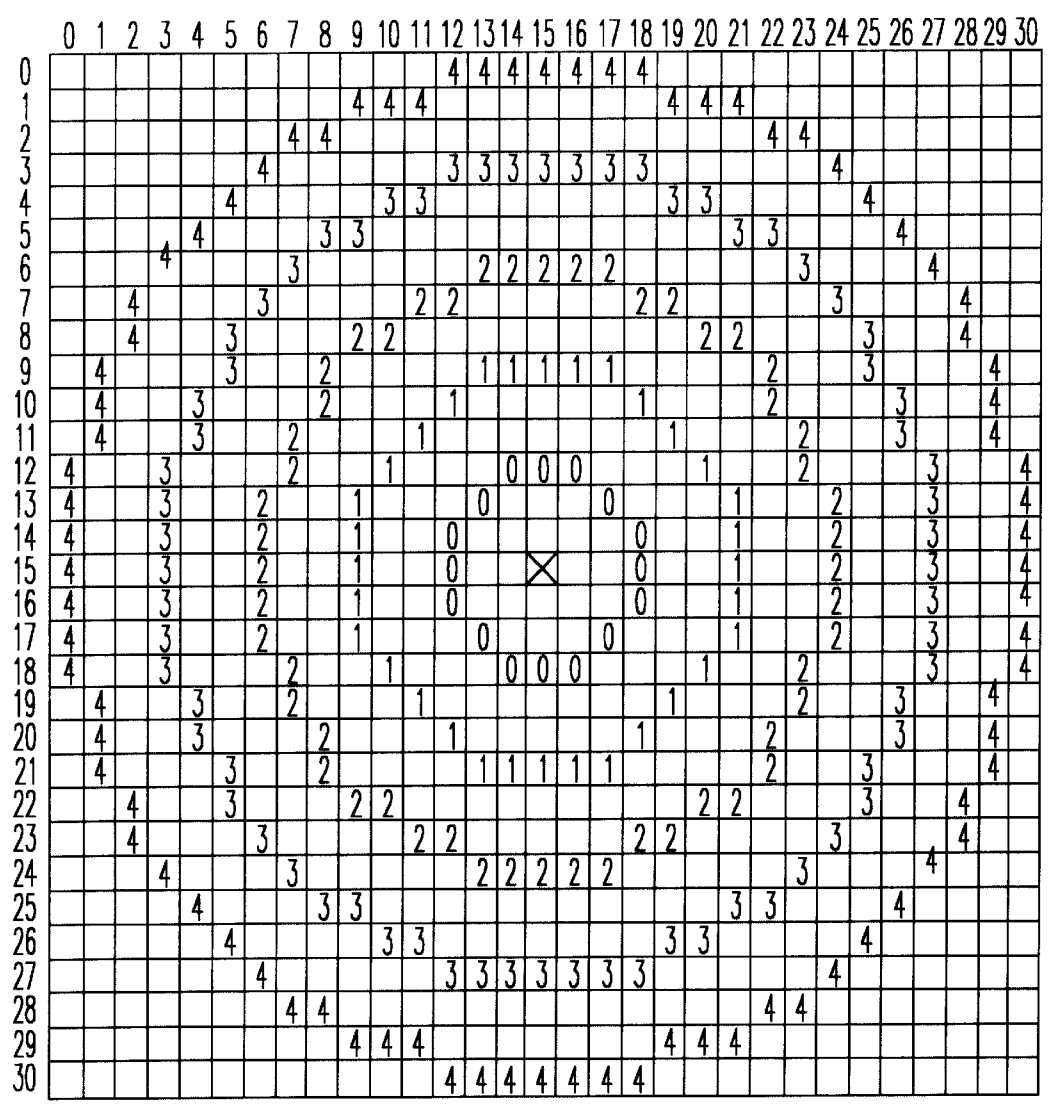
Figure 20:
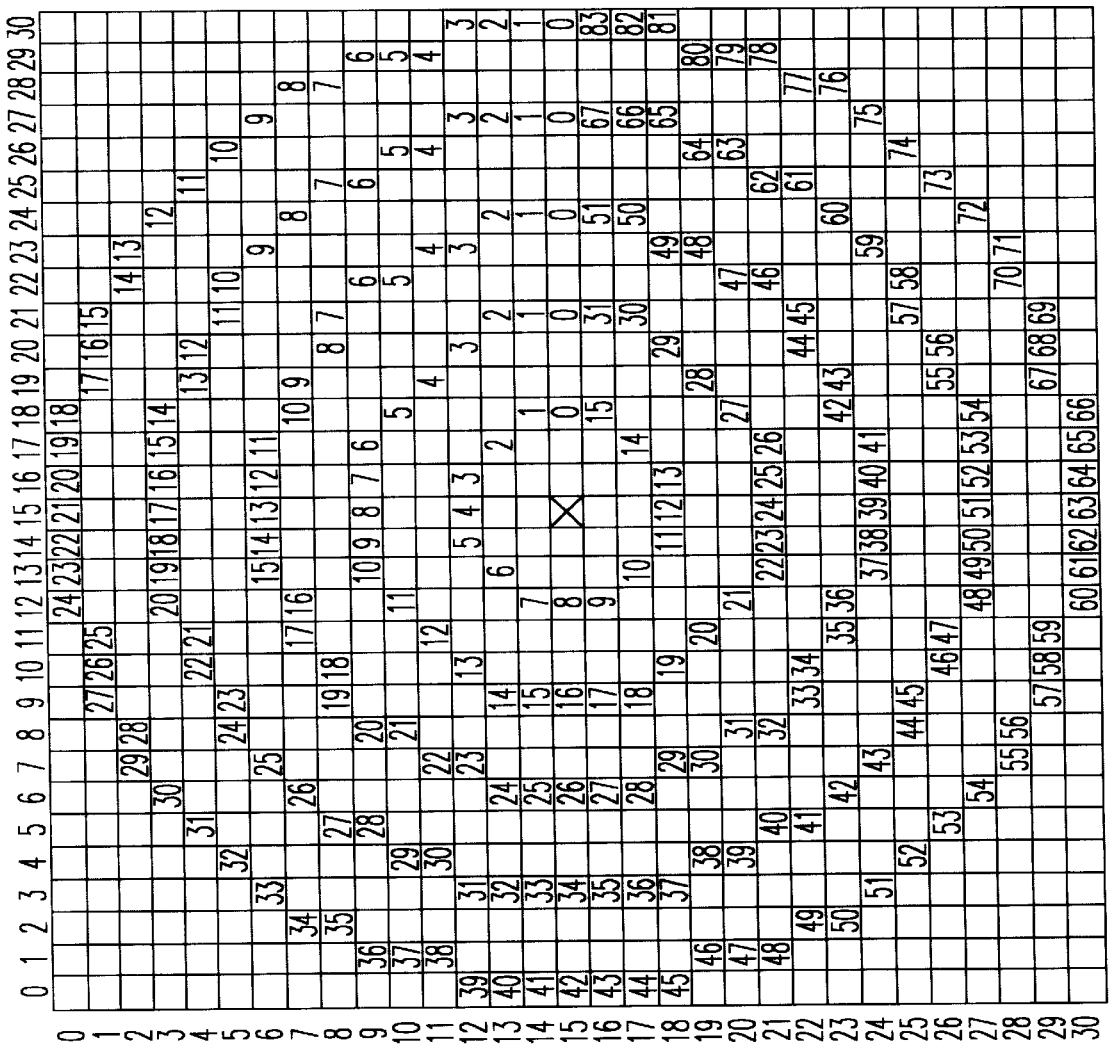
FIG. 20 illustrates one example of a circumference sequence table.

FIGS. 19 and 20 respectively illustrate one example of the circumference position table 63 and the circumference sequence table 64. A position marked by an "x" at (15, 15) is a center. From the center, positions on each circumference is marked by the same numeral. In this exemplary circumference table 63, there are five circumferences referenced by 0 through 4. The circumference reference numbers 0 through 4 is also used as an index to retrieve or store a characteristic value. In an alternative embodiment, an outer boundary is not limited to a circle, and the circumference table 63 is more properly named as an outer boundary position table. FIG. 20 illustrates one example of the circumference sequence table 64 containing the corresponding number and position of circumferences as the circumference position table 63. Each circumference includes a set of indexes ranging from 0 to 15 and from 0 to 31, and the index is used to retrieve or store a characteristic value.

Figure 21:
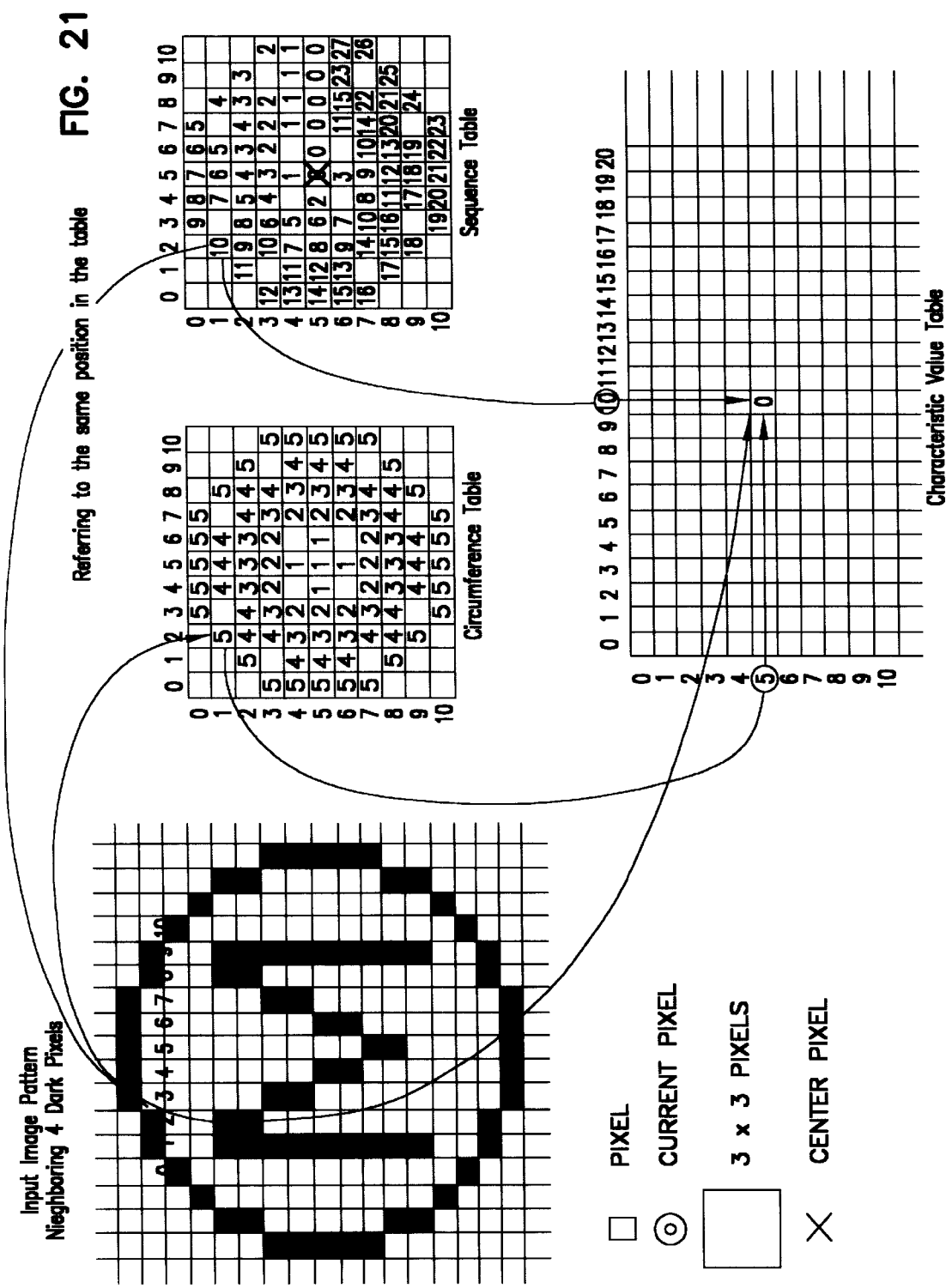
FIG. 21 illustrates the use of the circumference position table and the circumference sequence table in determining and storing a characteristic value according to the current invention.

FIG. 21 illustrates the use of the above described circumference table 63 and the sequence table 64 in determining and storing a characteristic value. To illustrate the use, the tables 63 and 64 have exemplary values. Each pixel in input image pattern data is scanned in both X as well as Y directions. Assuming a current pixel is located at X=2, Y=1 in the input image data, it is determine whether or not the current pixel requires a characteristic value determination by looking at the content of the circumference table at the corresponding coordinates. According to the exemplary circumference table, the cell at (2, 1) contains an index whose value is 5, and the presence of a value indicates that the current pixel requires a characteristic value determination. The index is a row location reference in a characteristic value table. By the same token, the exemplary sequential table at (2, 1) contains a second index whose value is 10, and the second index is used to reference a column location in the characteristic value table. A characteristic value for the current pixel is determined based upon a number of "on" or black pixels in a 3×3 pixel area whose center pixel is the current pixel. If the number of "on" pixels in the 3×3 pixel area is more than 4, a characteristic value is defined to be 1. Otherwise, the characteristic value is defined to be 0. In this example, since the number of the "on" pixels in the 3×3 pixel area is 4, the corresponding characteristic value is 0. The characteristic value 0 is then stored at the above specified location (10, 5) in the characteristic value table.

Figure 22:
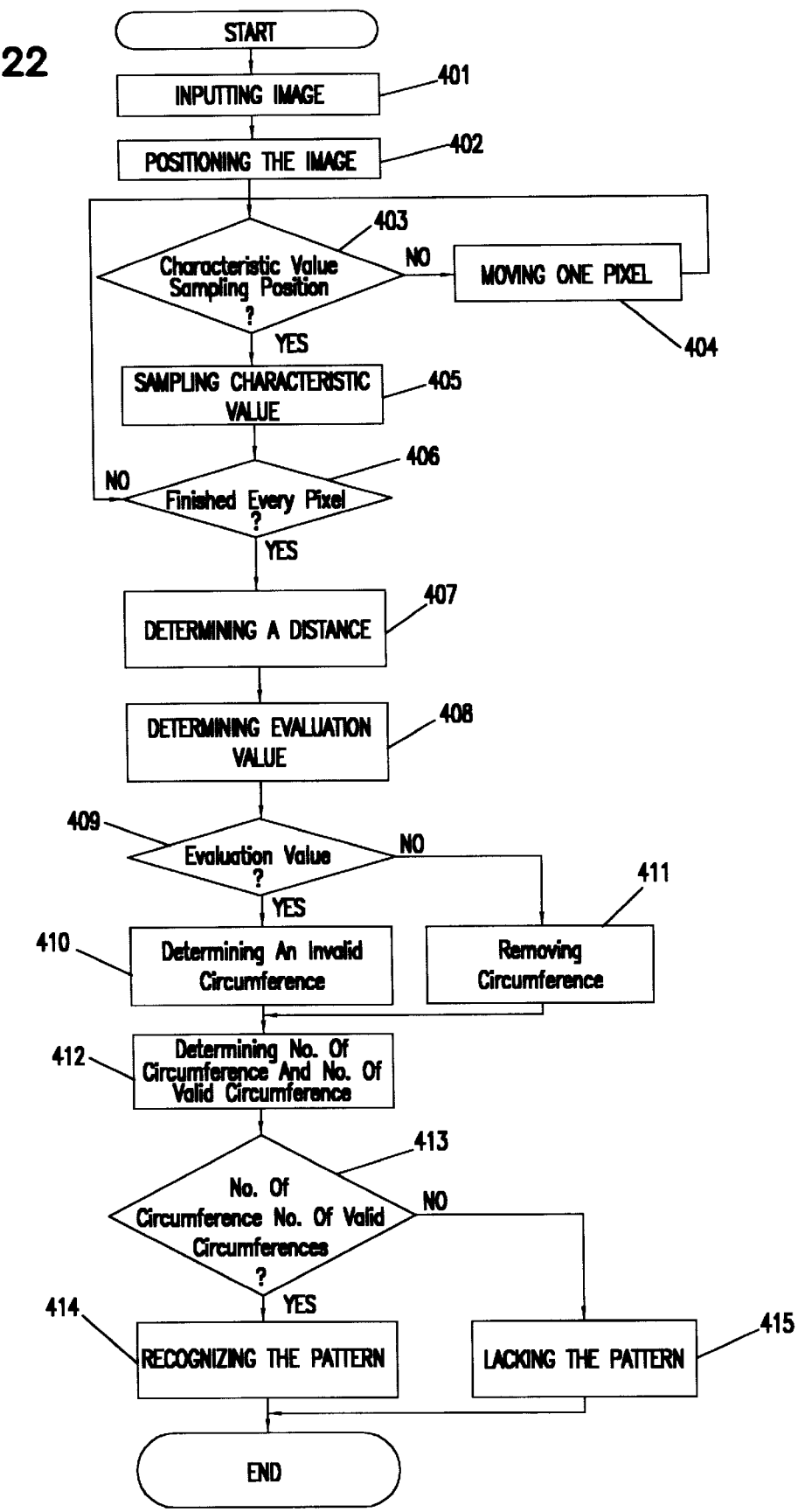
FIG. 22 is a flow chart illustrating steps involved in a preferred process of determining whether or not an input image pattern matches a standard image pattern according to the current invention.

Now referring to FIG. 22, steps involved in a preferred process of pattern determination according to the current invention are illustrated in a flow chart. Although this preferred process is designed for an image pattern having a circular outer boundary, the process according to the current invention is not limited to a circular outer boundary. An input image pattern having a circular outer boundary and the above determined rotational angle are inputted in a step 401. In order to determine a characteristic value, a center position of the input image pattern is aligned with that of the circumference table in a step 402. It is determined whether or not a current pixel requires a characteristic value determination in a step 403. As described above with respect to FIG. 21, if a characteristic value determination is not necessary, the current pixel position is moved by one pixel in a predetermined direction in a step 404. On the other hand, if the current pixel requires a characteristic value determination, a characteristic value is determined in a step 405 according to a predetermined rule such as one described above. The above steps 403 and 405 are repeated until every pixel is scanned. When the characteristic value determination is complete, a distance between a characteristic value of an input image pattern and that of a standard image pattern is determined in a step 407.

Still referring to FIG. 22, the following steps 408 through 415 are performed to determine whether an input image pattern matches a standard image pattern. In a step 408, an evaluation value is defined by an equation:

(1−(the above determined distance/a number of pixels on a circumference))×100.

If the evaluation value is not above a predetermined threshold value TH in a step 409, a corresponding circumference is removed for the further consideration. On the other hand, if the evaluation value exceeds the threshold value, the corresponding circumference is further statistically evaluated in a step 410. If the evaluation value for a current circumference is statistically low in view of other evaluation values, the current circumference is removed from further consideration. For example, when one pixel is moved in aligning the center of a circle, if a number of pixels on a circumference changing from "off" to "on" is large, the circumference is removed. In a step 412, a number of remaining circumferences and a number of valid circumferences are determined. The number of remaining circumferences is defined as a number of evaluated circumferences after invalid circumferences are removed in a step 410. The number of valid circumferences is defined as a total number of circumferences less invalid circumferences. In a step 413, the ratio between the number of remaining circumferences and the number of valid circumferences is compared to a second predetermined threshold value Th2 in a step 413. If the ratio exceeds the second predetermined threshold value Th2, the input image pattern is considered to match the standard image pattern in a step 414. On the other hand, if the ratio fails to exceed the second predetermined threshold value Th2, the input image pattern is not considered to match the standard image pattern in a step 415.

Now referring to FIG. 23, a distance determination step is further illustrated. A characteristic value of each input circumference is compared to that of a standard circumference by shifting the standard characteristic value by one position. At each shifted position, a difference between a pair of the corresponding two characteristic values is summed. The least difference is considered to be the distance for a circumference. In a preferred process according to the current invention, the above described shifting is minimized by shifting near a rotational angle. For example, if a rotational angle is 30 degrees, the values are shifted within a limited range from position 2 to position 6. This limited shifting saves both time and memory space.

Now referring to FIG. 24, a number of pixels in determining a distance is illustrated for an exemplary set of 16 circumferences. For example, circumference No 7 has a radius of 28 pixels while its circumference has a 160-pixel length. For this circumference data to be shifted by 9 pixels in total, the amount of total calculation is reduced to almost 5%.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of determining a rotational angle of an image pattern having an outer boundary, comprising:

inputting an input image pattern and a radial polynomial table containing sets of Zernike Moment (ZM) intermediate values for a predetermined specific size of the input image pattern, each set containing the ZM intermediate values each at a predetermined rotational angle for a predetermined periodicity;

determining a plurality of Zernike Moment (ZM) values by multiplying a predetermined set of the ZM intermediate values by pixel values at predetermined equidistant locations from a center of the input image pattern;

assigning an evaluation value for each of the ZM values by multiplying the ZM value and a corresponding periodicity; and determining a rotational angle of the input image pattern based upon a largest one of the evaluation values.

2. The method of determining a rotational angle according to claim 1 wherein the plurality of the Zernike Moment (ZM) values are each compared to a predetermined corresponding range of the ZM values.

3. The method of determining a rotational angle according to claim 2 wherein the evaluation value is assigned only when each of the ZM values is within the predetermined corresponding range.

4. The method of determining a rotational angle according to claim 1 wherein candidates for the rotational angle is determined for the periodicity.

5. The method of determining a rotational angle according to claim 1 wherein the rotational angle is verified after it is determined.

6. A system for determining a rotational angle of an image pattern having an outer boundery, comprising:

an input unit for inputting an input image pattern and a radial polynomial table containing sets of Zernike Moment (ZM) intermediate values for a predetermined specific size of the input image pattern, each set containing the ZM intermediate values each at a predetermined rotational angle for a predetermined periodicity;

a Zernike Moment generation unit connected to said input unit for determining a plurality of Zernike Moment (ZM) values by multiplying a predetermined set of the ZM intermediate values by pixel values at predetermined equidistant locations from a center of the input image pattern;

an evaluation unit connected to said Zernike Moment generation unit for assigning an evaluation value for each of the ZM values by multiplying the ZM value and a corresponding periodicity; and a rotational angle determination unit connected to said evaluation unit for determining a rotational angle of the input image pattern based upon a largest one of the evaluation values.

7. The system for determining a rotational angle according to claim 6 wherein said evaluation unit compares each of the plurality of the Zernike Moment (ZM) values to a predetermined corresponding range of the ZM values.

8. The system for determining a rotational angle according to claim 7 wherein said evaluation unit assigns the evaluation value only when each of the ZM values is within the predetermined corresponding range.

9. The system for determining a rotational angle according to claim 6 wherein said rotational angle determination unit determines a plurality of the rotational angles as candidates for the periodicity.

10. The system for determining a rotational angle according to claim 6 wherein said rotational angle determination unit verifies the rotational angle after it is tentatively determined.

* * * * *